US011940860B2

(12) United States Patent
Prabhakar et al.

(10) Patent No.: US 11,940,860 B2
(45) Date of Patent: Mar. 26, 2024

(54) POWER BUDGET MANAGEMENT USING QUALITY OF SERVICE (QOS)

(71) Applicant: Microsoft Technology Licensing, LLC, Redmond, WA (US)

(72) Inventors: Sandeep Prabhakar, Bellevue, WA (US); Mark Allan Bellon, Seattle, WA (US); Mika Megan Latimer, Redmond, WA (US); Tristan Anthony Brown, Houston, TX (US); Christopher Peter Kleynhans, Bothell, WA (US); Rahul Narayanan Nair, Kirkland, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/844,626

(22) Filed: Jun. 20, 2022

(65) Prior Publication Data
US 2022/0404888 A1 Dec. 22, 2022

Related U.S. Application Data

(60) Provisional application No. 63/213,392, filed on Jun. 22, 2021.

(51) Int. Cl.
*G06F 1/32* (2019.01)
*G06F 1/324* (2019.01)

(52) U.S. Cl.
CPC .................... *G06F 1/324* (2013.01)

(58) Field of Classification Search
CPC ........................................................ G06F 1/324
See application file for complete search history.

(56) References Cited

U.S. PATENT DOCUMENTS

| 2015/0346809 A1 | 12/2015 | Kumar |
| 2016/0291672 A1 | 10/2016 | Sharda et al. |
| 2017/0102676 A1 | 4/2017 | Park et al. |

(Continued)

FOREIGN PATENT DOCUMENTS

| EP | 2851796 A1 | 3/2015 |
| WO | 2015183528 A1 | 12/2015 |

OTHER PUBLICATIONS

Sahin, et al., "QScale: Thermally-Efficient QoS Management on Heterogeneous Mobile Platforms", In Proceedings of 35th International Conference on Computer-Aided Design, Nov. 7, 2016, 8 Pages.

(Continued)

*Primary Examiner* — Stefan Stoynov
(74) *Attorney, Agent, or Firm* — Barta Jones, PLLC

(57) ABSTRACT

Systems and methods for managing a power budget are provided. The method includes designating, by a power budget manager implemented on at least one processor, each of one or more applications with an individual quality of service (QoS) designation, the one or more applications executable by the at least one processor, assigning, by the power budget manager, a throttling priority to each of the one or more applications based on the individual QoS designations, determining, by the power budget manager, whether a platform mitigation threshold is exceeded, and responsive to determining that the platform mitigation threshold is exceeded, throttling, by the power budget manager, processing power allocated to at least one application of the one or more applications based on the throttling prioritization.

20 Claims, 6 Drawing Sheets

(56) References Cited

U.S. PATENT DOCUMENTS

| | | |
|---|---|---|
| 2017/0351534 A1 | 12/2017 | Herdrich et al. |
| 2018/0120920 A1 | 5/2018 | Iyigun et al. |
| 2019/0094941 A1 | 3/2019 | Sadasivam et al. |
| 2019/0317773 A1 | 10/2019 | Therien et al. |
| 2021/0055958 A1 | 2/2021 | Kirubakaran et al. |

OTHER PUBLICATIONS

"International Search Report and Written Opinion Issued in PCT Application No. PCT/US22/034195", dated Oct. 7, 2022, 11 Pages.

POWER BUDGET MANAGEMENT USING QUALITY OF SERVICE (QOS)

CROSS-REFERENCE TO RELATED APPLICATION(S) AND CLAIM OF PRIORITY

This application claims priority to U.S. Provisional Patent Application No. 63/213,392 entitled "POWER BUDGET MANAGEMENT USING QUALITY OF SERVICE (QOS)" filed on Jun. 22, 2021. The above-identified provisional patent application is hereby incorporated by reference in its entirety.

BACKGROUND

Modern electronic devices include resources, such as a central processing unit (CPU), that execute processing for the electronic device. In the example of CPUs, many CPUs include multiple processing cores made of silicon, which are subject to physical limitations within electronic devices including size, temperature ranges, and so forth. From a processing perspective, CPUs execute both foreground processing and background processing within a limited budget for processing power. Budgeting processing power for foreground and background processing includes determining an appropriate number of cores to be executing at a time, the correct frequency with which to execute the cores, and how to appropriately configure the system for different workloads. Throttling of this processing power to one or more applications is sometimes necessary, which can affect performance and the user experience.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and computerized method for managing a computing power budget is provided. The method includes designating, by a power budget manager implemented on at least one processor, each of one or more applications with an individual quality of service (QoS) designation, the one or more applications executable by the at least one processor, assigning, by the power budget manager, a throttling priority to each of the one or more applications based on the individual QoS designations, determining, by the power budget manager, whether a platform mitigation threshold is exceeded, and responsive to determining that the platform mitigation threshold is exceeded, throttling, by the power budget manager, processing power allocated to at least one application of the one or more applications based on the throttling prioritization.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1-6 the systems are illustrated as schematic drawings. The drawings may not be to scale.

DETAILED DESCRIPTION

Figure 1:
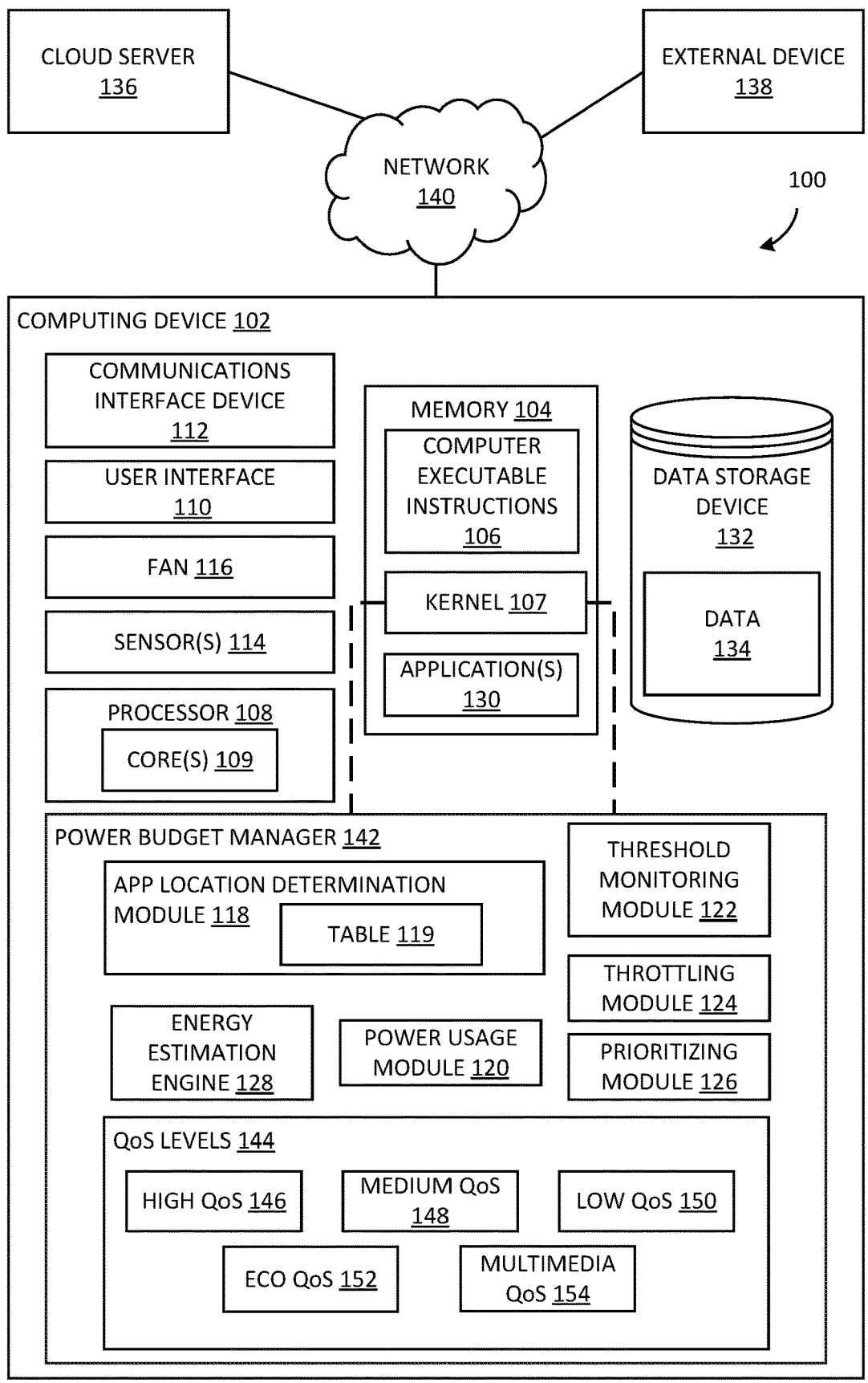
FIG. 1 is a block diagram illustrating a system for managing a computing power budget according to examples of the present disclosure.

The various implementations and examples will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Throttling of processing power to one or more computer applications is sometimes necessary because power budget and thermal limitations can cause reduced performance for a central processing unit (CPU) and/or graphics processing unit (GPU). However, the throttling of processing power can affect performance and the user experience. For example, even background work may be important to the user and thus should not be slowed down, so extensive throttling may not be desirable unless necessary for device integrity. On the other hand, in some scenarios even applications presented in the foreground may require throttling so that core system interactions do not degrade beyond a minimum acceptable limit. Therefore, the present disclosure provides systems and methods that determine a power budget for the overall system to stay within and then determine an optimal division of the power budget between a CPU, GPU, and neural processing unit (NPU) and/or within each of the CPU, GPU, and NPU based on different QoS designation levels to optimize the user experience.

Current solutions focus on mitigation without factoring in the particular type of work, system characteristics, and/or current ambient conditions when managing the budget of computing resources, such as the CPU. For example, some solutions throttle all processes based on a platform mitigation threshold, such as a critical temperature or a power threshold, being exceeded. This can degrade user experience, for example, by impacting applications currently executing in the foreground of a user interface. Some hardware may be programmed to automatically throttle all CPU frequency to fit within the programmed power and/or temperature constraints. Operations of the CPU may be throttled upon a critical temperature or power threshold being exceeded, but throttling operations are not initiated until it is required to maintain the integrity of the electronic device. This results in inefficient use of computing resources, in addition to impacting the user experience and overall computing performance.

Aspects of the present disclosure provide a technical solution by proactively throttling computing processes based on current system characteristics, current application or process type and usage, and other factors, taking into account performance and/or desirable energy efficiency characteristics of the workload while throttling, prior to exceeding a threshold, such as a critical temperature or power threshold. This intelligent management of computing resources improves the efficiency of throttling operations and improves the user experience and computer performance overall.

Aspects of the present disclosure provide systems and methods to manage the power budget of computing resources, such as a CPU, by proactively throttling computing processes, or applications, prior to exceeding a critical threshold where throttling is required to maintain the integrity of the electronic device. The present disclosure identifies quality of service (QoS) levels for currently executing applications, or processes, and distinguishes between the applications or processes based on the designated QoS levels, prioritizing the processing power allocated to the applications designated at a higher QoS level (such as those executing in the foreground) over those designated at a lower QoS level (such as those executing in the background), which improves the user experience while maintaining device integrity and functionality.

In some examples, the current operations of the computing resources, the performance and/or desired energy efficiency of the workload, and/or system constraints are taken into account to manage the power budgets. Aspects of the present disclosure provide a frequency cap to the clock speed of the processor that indicates a maximum clock speed at which computer threads can or are authorized to run. This frequency cap is an example of a mechanism to enable throttling that places a limit on selected lower priority QoS activity levels in order to control impact to the allocated processing power for other higher prioritized QoS activity levels. For example, the frequency cap may be selectively applied to the subset of processor cores executing low QoS level activities to restrict their clock speed, while other cores may concurrently execute high QoS level activities with no frequency cap or a different frequency cap. In some examples, the frequency cap can be dropped by a certain percentage, such as ten percent every 30 ms, if a limitation on the application is implemented, and increased by a certain percentage, such as ten percent every 30 ms, if the limitation on the application is removed. As another non-limiting example, the frequency cap minimum can be limited based on thermal and energy efficiency characteristics desired, for example no lower than 800 MHz. In other words, the range of limits controlled by frequency capping provides a means of reducing power output and improving thermal characteristics while maintaining a minimum frequency for energy efficiency. Aspects of the present disclosure further provide a reduction in cores available to one or more applications, which limits the processing power available to an application and frees processing power for other applications.

Aspects of the present disclosure further provide a dynamic feedback loop that continually or periodically monitors the power consumption of applications, processes, and/or threads being executed on the computing device and throttles processing power allocated to the same in an intelligent, gradual manner, prioritizing processing power allocations based on QoS levels, and throttling processing power allocated to non-prioritized applications first in order to mitigate the impact on higher priority applications and the overall user experience. As one non-limiting example, a model-specific register (MSR) value is regularly read and monitored to determine whether a limit has been reached. Where the limit has been reached, a throttling score is increased, and the updated throttling score is used to determine which throttling mechanisms are used and to what extent.

As referenced herein, an application executed on a computing device includes processes and threads. Each application is associated with a particular QoS level, which can be classified as high, medium, low, and so forth, to dynamically describe the performance, power budget, and/or characteristics of the application at current execution time. In examples where the computing device determines that throttling is needed, these QoS level designations are utilized in order to determine prioritization for throttling resource consumption.

FIG. 1 is a block diagram illustrating a system for managing a computing power budget according to examples of the present disclosure. The network environment 100 illustrated in FIG. 1 is provided for illustration only. Other examples of the network environment 100 can be used without departing from the scope of the present disclosure. In some examples, the computing power budget includes power being utilized and/or consumed by processing units including, but not limited to, a CPU, a GPU, a NPU, a disk, or any other suitable computing resource.

The network environment, also referred to herein as a system, 100 includes a computing device 102, an external device 138, and a cloud server 136. Each of the computing device 102, the external device 138, and the cloud server 136 are communicatively coupled to and communicate via a network 140. The computing device 102 represents any device executing computer-executable instructions 106 (e.g., as application programs, operating system functionality, or both) to implement the operations and functionality associated with the computing device 102. The computing device 102, in some examples, includes a mobile computing device or any other portable device. A mobile computing device includes, for example but without limitation, a mobile telephone, laptop, tablet, computing pad, netbook, gaming device, wearable device, Internet of Things (IoT) device, and/or portable media player. The computing device 102 can also include less-portable devices such as servers, desktop personal computers, kiosks, IoT devices, or tabletop devices. Additionally, the computing device 102 can represent a group of processing units or other computing devices. In some examples, the computing device 102 is a device executed in the cloud.

In some examples, the computing device 102 includes at least one processor 108, a memory 104 that includes the computer-executable instructions 106, and a user interface 110. The processor 108 includes any quantity of processing units, including but not limited to CPU(s), GPU(s), and NPU(s). The processor 108 is programmed to execute the computer-executable instructions 106. The computer-executable instructions 106 are performed by the processor 108, performed by multiple processors within the computing device 102, or performed by a processor external to the computing device 102. In some examples, the processor 108 is programmed to execute computer-executable instructions 106 such as those illustrated in the figures described herein, such as FIGS. 2-6. In various examples, the processor 108 is configured to execute one or more sensor(s) 114 and a power budget manager 142, which includes an application location determination module 118, a power usage module 120, a threshold monitoring module 122, a throttling module 124, a prioritizing module 126, and an energy estimation engine 128 as described in greater detail below. In other words, the sensor(s) 114 and the power budget manager 142 are implemented on and/or by the processor 108.

In some implementations, the processor 108 is a multi-core processor. A multi-core processor includes two or more processing units, such as cores 109, which execute the functions of the processor 108 by reading and executing the instructions 106. The cores 109 may be comprised of silicon. In some implementations, one or more of the cores 109 automatically monitor power consumption levels and automatically detect when a power consumption limit is reached. In some implementations, a particular core 109 may implement a particular application programming interface (API), such as an API specific to the original manufacturer of the core 109, in order for the kernel 107 to recognize signals, such as the signal that the power consumption limit for the core 109 is reached. In some examples, each core 109 may be classified into an efficiency class, so that when determining when and where to schedule foreground and background threads, the budget for processing power may be allocated among the cores 109 based on their efficiency class.

The memory 104 includes any quantity of media associated with or accessible by the computing device 102. The memory 104 in these examples is internal to the computing device 102, as illustrated in FIG. 1. In other examples, the memory 104 is external to the computing device 102 or includes memory components both internal and external to the computing device 102. The memory 104 stores data, such as the computer-executable instructions 106, at least one kernel 107, and one or more applications 130. The kernel 107 may be included in the computer-executable instructions 106 and is implemented on the operating system of the computing device 102. In some examples, the kernel 107 controls one or more software and hardware components of the computing device, including but not limited to the power budget manager 142 described in greater detail below. For example, the kernel 107 recognizes newly received signals for thermal and power throttling and uses these received signals to dynamically throttle applications and services executing by the computer-executable instructions 106. However, this example should not be construed as limiting. In some implementations, one or more cores 109 may have autonomous control of their CPU frequency. For example, a core 109 may interpret a programmed energy performance preference (EPP) control via an algorithm of the core 109 provider for frequency selection.

The applications 130, when executed by the processor 108, operate to perform various functions on the computing device 102. The applications 130 can communicate with counterpart applications or services, such as web services accessible via the network 140. In an example, the applications 130 represent downloaded client-side applications that correspond to server-side services executing in a cloud, such as the cloud server 136.

The user interface 110 includes a graphics card for displaying data to a user and receiving data from the user. The user interface 110 can also include computer-executable instructions, for example a driver, for operating the graphics card. Further, the user interface 110 can include a display, for example a touch screen display or natural user interface, and/or computer-executable instructions, for example a driver, for operating the display. In some examples, the touch screen display of the user interface 110 enables the user to select a network protocol to utilize for executing cross-device communication, as described in greater detail below. The user interface 110 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the computing device 102 in one or more ways.

In some examples, the user interface 110 displays one or more applications 130 that, at the time the application 130 is displayed, execute in the foreground. For example, a web browser application that is displayed in focus and visible on the user interface 110 is executed in the foreground while visible on the user interface 110. While displayed in focus and visible in the foreground, the web browser application may be designated as a high QoS application, as described in greater detail below. When the web browser application is removed from focus in the foreground, for example by being minimized, hidden behind other windows such that it is no longer fully visible, or otherwise removed from being displayed on the user interface 110, the web browser may be reclassified as a background application and given a lower QoS designation. For example, a new application, such as an electronic mail (email) application may be opened in the foreground, moving the web browser application to the background. While executing in the background, the web browser application may be designated as a low QoS application, as described in greater detail below. When the web browser application is minimized or moved to the background, the web browser is using less CPU resources, while still potentially working in the background to process activities initiated by a user while the application was in the foreground or on preprocessing activities to improve a future user experience when the application is restored from the background back to the foreground. It should be understood that the examples described herein of a web browser application and an email application are for illustration only and should not be construed as limiting. Any application or process executable on the computing device 102 can be used without departing from the scope of the present disclosure.

As referenced herein, each application(s) 130 is designated with a particular QoS level 144. The QoS level 144 designation of a particular application may change as the computing device 102 is utilized in different ways. For example, an application 130 in focus on the foreground of the user interface 110 can be designated with a high QoS level 146, but when the application 130 is removed from focus on the foreground, or otherwise moved to the background, the designation of the application 130 may be changed to a low QoS level 150.

Although low QoS 150, medium QoS 148, and high QoS 146 levels are described herein for exemplary purposes, the present disclosure contemplates various different QoS levels and is not limited by the description herein. A high QoS level 146 designation corresponds to high priority applications 130, such as application(s) 130 in focus or visible in the foreground of the user interface 110. A low QoS level 150 designation corresponds to lower priority applications 130, such as application(s) 130 executing in the background of the user interface 110 and/or not in focus or visible on the user interface 110. A medium QoS level 148 designation corresponds to application(s) 130 having a higher priority than applications with a low QoS level 150 designation, but a lower priority than applications having a high QoS level 146 designation. For example, a high QoS level 146 application may be in direct focus on the foreground and currently receiving user interaction, while a medium QoS level 148 application may be executing at least partially visible in the foreground or fully visible in the foreground but not in focus and a low QoS level 150 application may be executing in the background and not visible in the foreground at all.

It should be understood that the QoS level 144 designations are not limited to high QoS 146, low QoS 150, and medium QoS level 148 designations. For example, other QoS level 144 designations can include an eco QoS level 152 and a multimedia QoS level 154. Eco QoS 152 is a designation lower than the low QoS level 150 and may be the lowest QoS level designation in terms of performance and power allowances. In some examples, eco QoS level 152 can be applied to applications to provide energy efficiency and maximum reduction in power consumption. Applications assigned to the eco QoS level 152 may include services responsible for downloading and installing software updates, background tabs in a web browser, and services responsible for backing up files.

In another example, multimedia QoS level 154 is a designation that may be applied to the specific threads which batch process buffered multimedia content. In other words, multimedia QoS level 154 may be assigned to application(s) 130 that decode/encode many frames of content at once. It should be understood that the description of QoS levels is provided for example only and should not be construed as limiting. The computing device 102 can include more or fewer QoS levels 144 than those described herein without departing from the scope of the present disclosure.

The computing device 102 further includes a communications interface device 112. The communications interface device 112 includes a network interface card and/or computer-executable instructions, such as a driver, for operating the network interface card. Communication between the computing device 102 and other devices, such as but not limited to the cloud server 136, can occur using any protocol or mechanism over any wired or wireless connection. In some examples, the communications interface device 112 is operable with short range communication technologies such as by using near-field communication (NFC) tags.

The computing device 102 further includes a data storage device 132 for storing data, such as, but not limited to data 134. The data storage device 132 in some non-limiting examples includes a redundant array of independent disks (RAID) array. In some examples, the data 134 is the data to be transferred via cross-device communication using an available network protocol. For example, the data 134 can be application data corresponding to one or more applications 130 to be transferred via cross-device communication, which includes the size of the data, a type of data, an application type, a device type, and so forth.

The data storage device 132, in this example, is included within the computing device 102, attached to the computing device 102, plugged into the computing device 102, or otherwise associated with the computing device 102. In other examples, the data storage device 132 includes a remote data storage accessed by the computing device 102 via the network 140, such as a remote data storage device, a data storage in a remote data center, or a cloud storage.

The computing device 102 includes one or more sensors 114 configured to capture data. In some examples, the captured data is the data 134 to be transferred to another device via cross-device communication. For example, the captured data 134 can be image data, video data, textual data, application data, and so forth. In some examples, the data 134 that is transferred to another device is transferred without user involvement. For example, where one or more of the devices involved in the cross-device communication is an IoT device, the IoT device can execute cross-device communication to an external device, such as the external device 138, based upon being within a range of the IoT device, being connected to the same wireless network, such as a WiFi™ network, and so forth.

In some examples, the one or more sensors 114 collect data in real-time or near real-time. As referenced herein, the collection of data in real-time or near real-time refers to collection of data without noticeable latency such that data collected by the one or more sensors 114 is immediately collected and sent for analysis.

In some examples, the computing device 102 includes one or more fans 116. The one or more fans 116 include one or more blades that rotate to cool one or more elements of the computing device 102. For example, based on the one or more sensors 114 determining the temperature of the computing device 102 is above a threshold temperature, the one or more fans 116 are activated to assist in cooling the computing device 102. Accordingly, in some examples the temperature of the computing device 102 can be maintained and/or managed without throttling CPU processing power to one or more applications 130.

The power budget manager 142 is implemented on the kernel 107 and executes one or more processes in order to manage the power budget(s) of the computing device 102, such as CPU power budget, GPU power budget, NPU power budget, and/or any combination of the foregoing. In some examples, each of the application location determination module 118, the power usage module 120, the threshold monitoring module 122, the throttling module 124, the prioritizing module 126, and the energy estimation engine 128 are implemented by the power budget manager 142.

The application location determination module 118 determines a current location of each application 130 being executed by the processor 108. As used herein, application(s) 130 is/are a program designed to carry out a specific task on the computing device 102. For example, the application(s) 130 may include, but are not limited to, web browser applications, messaging applications, navigation/mapping applications, word processing applications, game applications, an application store, applications included in a suite of productivity applications such as calendar applications, instant messaging applications, document storage applications, video and/or audio call applications, and so forth, and specialized applications for a particular computing device 102. The location of applications may refer to where an application is currently executing, such as in the foreground or background for example. In other examples, locations may refer to whether an application is fully in focus, or visible, at a user interface, partially in focus, or not in focus or visible at the user interface. For example, an application 130 being executed in the foreground is an application that, at the time of the execution, is in focus and visible on the user interface 110. An application 130 being in focus on the foreground may also be designated as a high QoS application in order to be presented to a user at an increased functional level relative to an application 130 designated as a lower QoS level and, accordingly, may utilize a higher percentage of CPU processing power. In some examples, the functional level is determined based on performance metrics of the computing device 102.

As another example, an application 130 being executed in the background is an application that, at the time of the execution, is not being presented on the user interface 110 (e.g., is minimized or hidden from view by another application, is executing a background refresh to search for new data, or is an operating system function that does not have a user interface 110 facing element). An application 130 being executed in the background may be designated as a low QoS application and may be allocated a lower percentage of CPU processing power than an application being presented to the user in the foreground.

The application location determination module 118 identifies, for each application 130 being executed by the computing device 102, in real-time, whether the particular application 130 is being executed in the foreground or in the background. As referenced herein, in real-time can refer to frequent recalculations of a score for each application 130, such as recalculating a score every 30 ms or some other configurable interval of time, to determine a current application status and enable sufficient processing power to be properly allocated to high QoS applications. In some examples, the score may be a throttling score used to determine which throttling mechanisms are used and to what extent. An example method of iteratively calculating the throttling score is described in greater detail below in the description of FIG. 4.

In some examples, application(s) 130 can transition from the foreground to the background or from the background to the foreground relatively quickly. For example, a user may select a particular application 130 and bring the selected application into focus in the foreground, which may transition a previously in focus application out of focus, partially or fully into the background. In another example, a user may minimize an application 130 to immediately place the application 130 in the background. In yet another example, an application 130 may programmatically minimize or maximize its window without receiving a user interaction, which would cause the application to transition between background and foreground. Accordingly, an application 130 may transition from a high QoS to a medium or low QoS or from a low or medium QoS to a high QoS, or from a medium QoS to a low or high QoS, depending upon user interaction with the application 130. In some examples, the application location determination module 118 assigns the QoS level 144 to each executing application 130 in real-time or near real-time and generates, or maintains, a dynamic table 119 identifying the currently executing applications 130 and their current assigned status and QoS level designations.

The power usage module 120 determines an amount of processing power currently allocated or utilized by each application 130. The amount of processing power can refer to any one of CPU processing power, GPU processing power, NPU processing power, and so forth. In some examples, the processing power currently allocated to an application 130 is determined based on the allocated processing power derived from QoS designation of a group to which the application 130 belongs, such as high QoS, medium QoS, or low QoS. In other examples, the processing power being utilized by an application 130 is determined individually, by measuring the individual processing power being actively utilized by the application 130. The allocation and utilization of processing power may also be considered in combination by power usage module 120, for example.

In some examples, the power usage module 120 further determines power usage and availability of the computing device 102 as a whole. For example, the power usage module 120 determines whether the computing device 102 is plugged in to a power source or whether the computing device 102 is operating based on power supplied from a battery. The throttling module 124, described in greater detail below, can determine a rate at which the throttling of processing power is to be conducted based at least in part on the determination by the power usage module 120 of the computing device 102 being plugged in or operating on battery power. In some examples, the throttling module 124 throttles processing power more rapidly when the computing device 102 is operating on battery power than when the computing device 102 is plugged in to a power source because, without the benefit of an external power source, the computing device 102 may need to conserve more processing power. In other words, the throttling module 124 may throttle the processing power more aggressively when the computing device 102 is operating on battery power than when not operating on battery power, with less focus on the particular processes being throttled.

The threshold monitoring module 122 monitors one or more thresholds of the computing device 102. The one or more thresholds can include, but are not limited to, temperature thresholds, power consumption thresholds, noise levels of one or more fans 116 of the computing device 102, and/or application performance metrics of an application 130 presented on the user interface 110. The application performance metrics may be obtained from the respective application 130 evaluating its own performance criteria or obtained from outside observable performance metrics, such as the frame rate of the application 130. In some examples, one or more thresholds are sub-divided into multiple sub-thresholds in order to proactively manage resource consumption. For example, a temperature threshold can include a first sub-threshold and a second sub-threshold. The first sub-threshold can indicate a temperature at which throttling is recommended in order to effectively or proactively manage a temperature of the computing device 102 and the second sub-threshold can be a critical threshold that indicates a temperature that should not be exceeded in order to maintain the structural integrity of the computing device 102. Any number of intermediate sub-thresholds may be contemplated by this disclosure, beyond a first and second sub-threshold.

In some examples, the one or more sensors 114 collect data 134 that is monitored by the threshold monitoring module 122. For example, the one or more sensors 114 can include a thermometer that measures a temperature of the computing device 102. The threshold monitoring module 122 monitors the readings of the thermometer to determine when the first threshold and/or the second threshold is exceeded or approaching being exceeded. In another example, the one or more sensors 114 can include a decibel meter that measures a noise output of one or more fans 116 or an accelerometer that measures a revolutions per minute (RPM) of the one of more fans 116. As described above, the one or more fans 116 can be used to maintain and/or manage the temperature of the temperature of the computing device 102. However, in some examples the one or more fans 116 alone can be insufficient to effectively manage the temperature of the computing device 102. In these examples, the threshold monitoring module 122 determines the noise level being output by the one or more fans 116 has reached or is approaching one of a first noise level threshold and a second noise level threshold.

In another example, the one or more sensors 114 senses a battery level and/or a rate at which the battery is draining. The platform mitigation thresholds may include a speed threshold at which the battery is draining, and when the threshold is exceeded, throttling is initiated as described herein. In yet another example, the one or more sensors 114 monitor hardware signals. For example, a sensor 114 can determine that the user interface 110 is not currently presenting any content, indicating that the user interface 110 is turned off or, where the computing device 102 is a laptop computer, the lid has been closed.

In some examples, the threshold monitoring module 122 monitors one or more platform mitigation thresholds by performing a processor power management (PPM) check at regular intervals, such as every 30 ms. At each PPM check, the threshold monitoring module 122 reads an updated model-specific register (MSR) value to determine whether one or more power limits have been exceeded. As described herein, a power limit may be a runtime average power limit (RAPL), or PL1, that measures a thermal limit, an active cooling limit measured by revolutions per minute (RPM) of the fan 116, and/or a power usage limit that measures power usage by various QoS level 144 applications. Where the PL1 has been reached, or exceeded, the threshold monitoring module 122 adds to a throttling score. The throttling score is used to determine which throttling mechanisms are used and to what extent, as described in greater detail below with regards to FIG. 5. Where the PL1 has not been reached, the throttling score is reduced. Accordingly, the throttling score is used to determine how much to reduce power for executing applications.

The throttling module 124 throttles processing power allocated to one or more application(s) 130 as described herein based in part on the prioritization determined by the prioritizing module 126 and/or in part on the threshold monitoring module 122 determining one or more thresholds have been exceeded. The throttling module 124 can throttle the processing power allocated to the one or more applications 130 by one or more methods described in greater detail herein. For example, the throttling module 124 may throttle the processing power of one or more applications 130 by implementing one or more of an energy performance preference (EPP) control, reducing a number of cores 109 available to the application 130, and implementing a cap on the maximum CPU frequency allocated to the application 130 as described in greater detail below in the description of FIG. 5.

In some examples, the throttling module 124 throttles processing power allocated to applications 130 determined to be low QoS and assigned a high priority by the prioritizing module 126. In other words, the low QoS level applications 130, which are the least valuable activities at the time, are throttled to prioritize the activities of higher QoS level applications 130. In another example, the throttling module 124 throttles processing power allocated to an application 130 determined to be using the most CPU processing power. Thus, by throttling the processing power allocated to the application 130 consuming the most CPU processing power, the highest impact of throttling may be achieved in the shortest amount of time possible. For example, where the computing device 102 detects relatively little low QoS level activity but significant medium QoS level activity, throttling processing power allocated to low QoS applications 130 may be ineffective or operate slowly to reduce the power consumption. However, in this example, where there is significant medium QoS level activity, throttling the processing power allocated to the medium QoS applications 130 first may more quickly reduce power consumption. In some examples, the throttling module 124 throttles some or all of the processing power allocated to background applications, or low QoS level applications, and does not throttle processing power allocated to the foreground applications, or high QoS applications, unless a critical threshold is exceeded indicating processing power allocated to both foreground applications and background applications should be throttled.

In some implementations, the throttling module 124 continually throttles the processing power allocated to one or more applications 130 assigned the low QoS level 150. In other implementations, the throttling module 124 throttles the processing power allocated to one or more applications 130 based on the threshold monitoring module 122 determining that one or more thresholds of the computing device 102 are exceeded.

The throttling module 124 may throttle the processing power allocated to one or more applications 130 according to varying levels of aggressiveness based at least in part on the MSR value identified by the threshold monitoring module 122. In some implementations, the throttling module 124 throttles the processing power allocated to one or more application 130 based on one of four levels of throttling aggressiveness. However, more or fewer than four levels may be possible without departing from the scope of the present disclosure. In some implementations, the throttling module 124 adjusts the throttling aggressiveness based on each updated MSR value. For example, the throttling module 124 may escalate the throttling to a higher throttling level based on the MSR value indicating additional throttling is necessary or lower the throttling to a lower throttling level based on the MSR value indicating throttling may be reduced.

For example, a first level of aggressiveness is the most conservative level of throttling and includes the lowest amount of throttling the processing power allocated to one or more application 130. The first level of aggressiveness may include, for example, throttling such that an application performance will not degrade by more than 600%, the fan 116 will not spin at a rate higher than 8,000 RPM, and the drain rate on a battery of the computing device 102 will not be more than 20 W, for example. A second level of aggressiveness may include more aggressive throttling than the first level, for example, such that an application performance will not degrade by more than 400%, the fan 116 will not spin at a rate higher than 7,000 RPM, and the drain rate on the battery will not be more than 15 W. A third level of aggressiveness may include more aggressive throttling than each of the first level and the second level, for example, such that an application performance will not degrade by more than 50%, the fan 116 will not spin at a rate higher than 5000 RPM, and the drain rate on a battery of the computing device 102 will not be more than 10 W. A fourth level of aggressiveness may be the most aggressive level of throttling. For example, the fourth level of aggressiveness may be implemented only in an extreme scenario and used only to identify and rectify problems in the QoS system as a whole. In the fourth level of aggressiveness, low QoS 150 applications and eco QoS 152 applications are limited to the lowest frequency and only one core 109.

As described herein, the prioritizing module 126 prioritizes the one or more application(s) 130 based on QoS level designations 144 assigned by the application location determination module 118. The prioritizations provided by the prioritizing module 126 are used by the throttling module 124 to determine an order in which applications' processing power is throttled. In some examples, multiple applications 130 may be designated with a high QoS 146 designation. In these examples, the prioritizing module 126 prioritizes the high QoS 146 applications 130 based on known levels of importance of the processing power to the application performance or user experience. These known levels of importance may be included in the instructions 106 stored in the memory 104 or may be inferred from heuristics over a period of time, such as throughout the lifetime of prioritizing applications 130 or a subset thereof (e.g., a particular recent time period).

It should be understood that as described herein, a throttling priority is the inverse of an application priority. For example, an application executing in the background and assigned a low QoS designation will have a low application priority, because the application is executing in the background, but a high throttling priority, because the low QoS designation indicates the application will be one of the first to be throttled. In contrast, an application executing in the foreground and assigned a high QoS designation will have a high application priority, because the application is executing in the foreground, but a low throttling priority, because the high QoS designation indicates the application will be one of the last to be throttled.

As described herein, the energy estimation engine 128 analyzes parameters including how long a task takes to execute on the CPU, on how many CPU cores a particular application 130 runs, at what frequency the particular application 130 runs, and how performant the cores are. Based on this analysis, the energy estimation engine 128 determines approximate power consumed by the application 130 and then determines how much to throttle each QoS level of work. In some examples, power consumption is directly measured, and this measurement is used to apportion measured power consumption to the application 130. Accordingly, the energy estimation engine 128 determines and measures how a particular application 130 can, in some instances, utilize a disproportionate amount of processing power. Based on this determination of a particular application using the disproportionate amount of processing power, the prioritizing module 126 can prioritize the application 130 for throttling, the throttling module 124 can throttle the particular application 130, and so forth.

It should be understood that, although examples provided herein address a CPU power budget, these examples should not be construed as limiting. Various examples of power budgets can be allocated and/or throttled as described herein, including, but not limited to, a CPU, a GPU, an NPU, a disk, or any other suitable computing resource power budget, without departing from the scope of the present disclosure.

Figure 2:
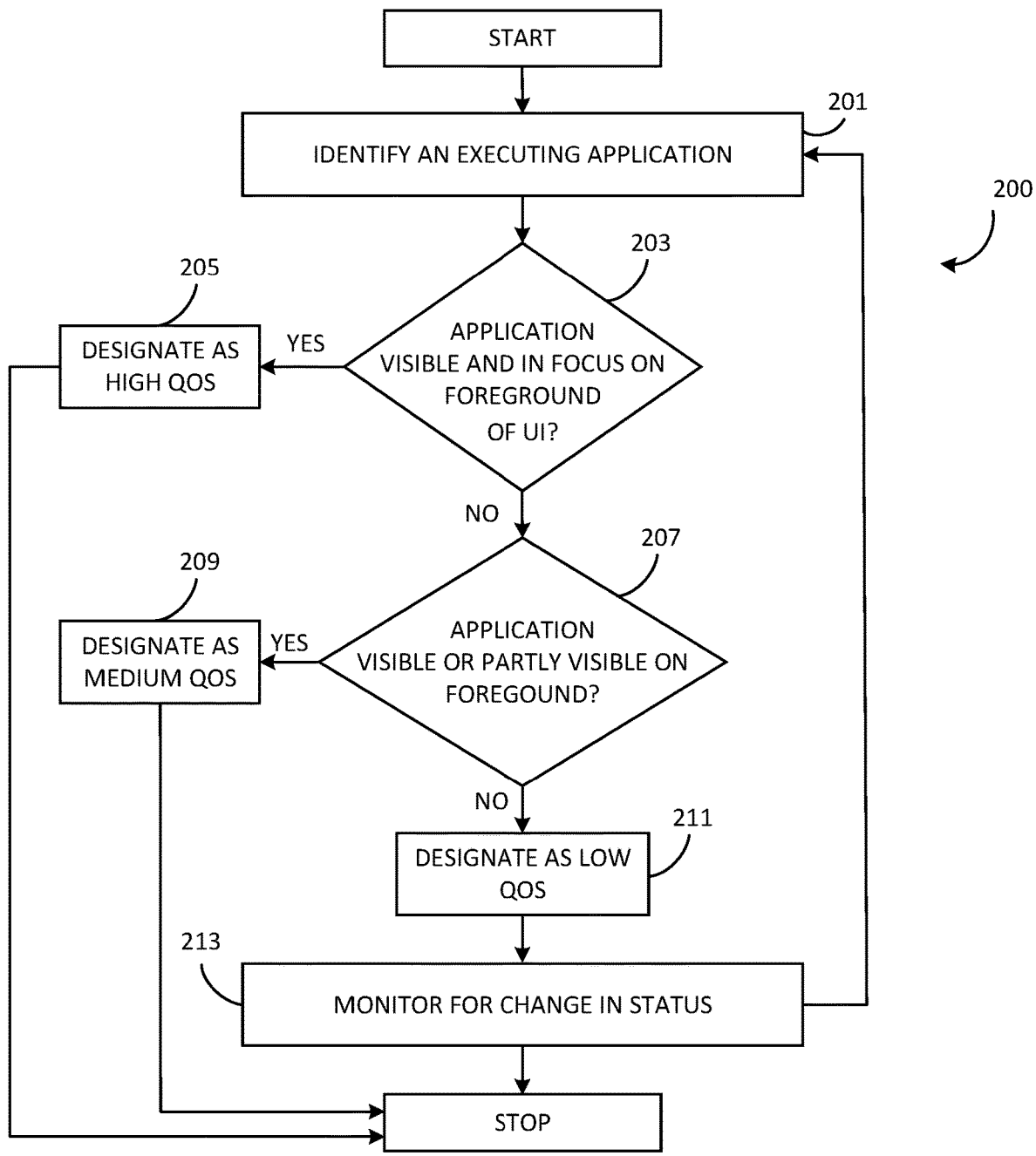
FIG. 2 is a computerized method of providing a QoS designation to an application according to examples of the present disclosure.

FIG. 2 is a computerized method of providing a QoS designation to an application according to examples of the present disclosure. The computerized method of FIG. 2 is for illustration only and should not be construed as limiting. Various examples of the computerized method can be used without departing from the scope of the present disclosure. In some examples, the method 200 is implemented by the power budget manager 142 of computing device 102 and/or the computing device 600.

The method 200 begins by identifying an executing application 130 at operation 201. Various examples of the application 130 are possible. In some implementations, the application 130 is a front-end facing application executing and presented on the user interface 110 where it can be interacted with by a user. In other implementations, the application 130 is a back-end application operating in the background of the computing device 102. The application 130 is executed by one or more cores 109 of the processor 108.

At operation 203, the application location determination module 118 determines whether the executing application 130 is visible and in focus on the foreground of user interface 110. An application 130 executing on the foreground, that is visible and in focus or most prominently displayed on the user interface 110 may be considered of higher importance to a user experience than another application currently executing but in the background of the computing device 102. In focus may refer to current user interaction with the application, in some examples, where one or more applications are visible or partly visible at the user interface, but only one application is currently receiving user interaction and is therefore in focus relative to the user experience. Accordingly, the processing power allocated to currently executing applications is prioritized. Where the application 130 is determined to be visible and in focus, executing on the foreground of the user interface 110, the application location determination module 118 designates the application 130 as high QoS 146 and stores the designation in the table 119 at operation 205.

Where the process determines that currently executing application 130 is not visible and in focus on the foreground of user interface 110, the application location determination module 118 determines whether the executing application 130 is visible or partly visible on the foreground of the user interface 110 at operation 207. For example, the executing application 130 may be presented on the user interface 110 but sharing space on the user interface 110 with a second application. Where the second application is being directly interacted with and is in focus, the executing application 130 may be considered not in focus even though visible or partly visible on the user interface. Where the application location determination module 118 determines the executing application 130 is visible or partly visible but not in focus on the foreground of the user interface 110, the application location determination module 118 designates the executing application 130 as medium QoS 148 and stores the designation in table 119 at operation 209. As described herein, medium QoS 148 is a lower priority than high QoS 146.

Where the process determines that the executing application 130 is not visible or partly visible and is not in focus on the foreground of the user interface 110, the application location determination module 118 designates the executing application 130 as low QoS 150 and stores the designation in the table 119 in operation 211. As described herein, low QoS 150 is a lower priority than medium QoS 148.

It should be understood that the designation of a QoS level 144 to an application 130 is dynamic. In other words, the QoS level 144 designation of an application 130 can change based on a status of the application 130 changing. For example, an application 130 designated as high QoS 146 can be re-designated as medium QoS 148 based on the application 130 becoming no longer in focus but remaining on the user interface 110, or re-designated as low QoS 150 based on the application 130 being removed from the user interface 110 but continuing to execute in the background.

Accordingly, in operation 213, the application location determination module 118 monitors for change in status of currently executing applications, and may iteratively return to operation 201 as change is detected and/or at periodic intervals of time to update the status check on currently executing applications. Status change may occur from user interaction, which may include opening a new window in the foreground of the user interface 110 corresponding to the executing application 130 for example. In this example, because the status of the executing application 130 has now changed to visible and in focus on the foreground of the user interface 110, the process re-designates the executing application 130 to high QoS 146 at operation 205.

It should be understood that process 200 can be executed in parallel for different applications 130. For example, more than one application 130 can be identified as currently executing in operation 201. Further, an executing application 130 having a designated QoS level 144 may be continually or periodically monitored in order to ensure the designated QoS level 144 designation is correct. For example, the power usage module 120 may actively monitor the power consumption of a particular executing application 130, the QoS level 144 of which is designated by the application location determination module 118.

Figure 3:
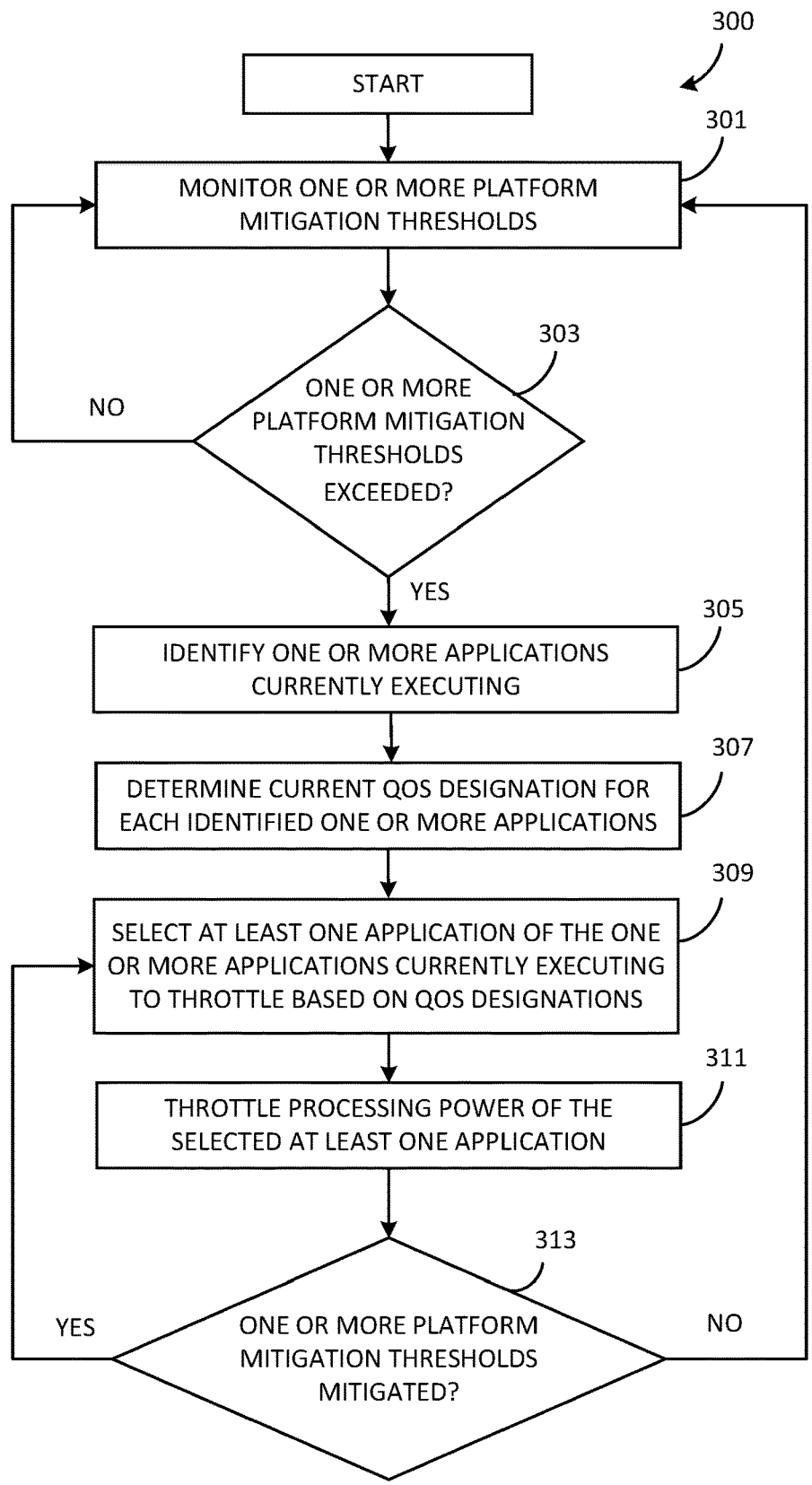
FIG. 3 is a computerized method of managing a central processing unit (CPU) power budget according to examples of the present disclosure.

FIG. 3 is a computerized method of managing a CPU power budget according to examples of the present disclosure. The computerized method of FIG. 3 is for illustration only and should not be construed as limiting. Various examples of the computerized method can be used without departing from the scope of the present disclosure. In some examples, the method 300 is implemented by the computing device 102 and/or the computing device 600.

The method 300 begins by monitoring, by the power budget manager 142, one or more platform mitigation thresholds at operation 301. In some implementations, the one or more platform mitigation thresholds can each include a plurality of sub-thresholds, such as a first sub-threshold level and a second sub-threshold level for example. In this example, the first sub-threshold level is a threshold in which throttling is recommended to proactively mitigate resource consumption and the second sub-threshold level is higher than the first threshold level and is a threshold where throttling is needed in order to maintain the structural integrity of the computing device 102. In some examples, monitoring the platform mitigation thresholds including executing periodic PPM checks to iteratively identify an updated MSR value. Examples of the one or more platform mitigation thresholds may include, without limitation, temperature thresholds, power consumption thresholds, noise level thresholds, and/or application performance metrics of an application 130 presented on the user interface 110. In one particular example, the noise level threshold may be determined by a mode of operation in which the computing device 102 is presently operating. For example, the computing device 102 may include a silent mode in which the fan 116 noise is not to exceed the noise level threshold. The silent mode may be entered manually by a user operating the computing device 102 or dynamically based on one or more applications 130 presently executing. For example, where the application 130 executing is a video teleconferencing application, the power budget manager 142 may identify the threshold in order for the application 130 to not pick up fan noise on a microphone of the computing device 102, which otherwise may affect the user experience.

In operation 303, the power budget manager 142 determines whether the one or more monitored platform mitigation thresholds is exceeded. In some implementations, determining whether the one or more monitored platform mitigation thresholds is exceeded includes comparing the most recent iteration of the identified MSR value with a value corresponding to the platform mitigation threshold. Where the MSR value is greater than the platform mitigation threshold value, the platform mitigation threshold is exceeded, and where the MSR value is less than the platform mitigation threshold value, the platform mitigation threshold is not exceeded.

In some implementations, power budget manager 142 determines the one or more platform mitigation thresholds are exceeded based on system data 134 received from the sensor(s) 114 and/or signals received by kernel 107. For example, the sensor(s) 114 collects system data 134 regarding one or more of a temperature of the computing device 102, power consumption levels of the computing device 102, noise level, such as in decibels (dB) of the fan 116, and application performance levels of the computing device 102. The collected system data 134 is compared to the one or more platform mitigation thresholds by power budget manager 142 to determine whether a platform mitigation threshold, or sub-threshold, is exceeded. In examples where the collected system data 134 indicates a particular level at or above one or more of the platform mitigation thresholds, or sub-thresholds, the power budget manager 142 determines the respective platform mitigation threshold has been exceeded, and proceeds to operation 305. In other examples, where the collected system data 134 indicates a particular level below one or more of the platform mitigation thresholds, or sub-thresholds, the processor 108 determines the respective platform mitigation threshold has not been exceeded, and returns to operation 301 and continues to monitor the one or more platform mitigation thresholds.

At operation 305, the power budget manager 142 identifies the one or more applications 130 currently executing and determines a current QoS designation for each of the identified one or more applications 130 at operation 307. In some implementations, the current QoS designations are stored in the dynamic table 119 generated and maintained by the application location determination module 118 of power budget manager 142.

In some implementations, determining the current QoS level designations for the one or more applications includes identifying a previously assigned designation from the table 119, for example as designated according to process 200 in FIG. 2, in a recent interval before a next status check. In other implementations, determining the current QoS level designations includes a real-time determination using the method 200 illustrated in FIG. 2.

At operation 309, the throttling module 124 of power budget manager 142 selects at least one application of the one or more applications currently executing to throttle based on the QoS level designations. In some implementations, the throttling module 124 throttles the processing power allocated to each application having a low QoS designation. In another implementation, the computing device 102 identifies a particular application that is using the largest amount of processing power and throttles the processing power of that particular application in order to maximize the impact of the throttling. In yet another implementation, the prioritizing module 126 generates a priority ranking of applications 130 for which to throttle the processing power based on a combination of amount of processing power used and the QoS designation of the applications 130.

At operation 311, the throttling module 124 throttles the processing power allocated to the selected at least one application of the one or more applications. In some examples, the throttling is prioritized based on the QoS level designations, where one or more applications assigned the highest throttling priority are the applications with a low QoS designation. In some implementations, throttling the processing power of a particular application includes restricting the amount of processing power or other computing resources available to the particular application. By restricting the amount of processing power or other computing resources available to the particular application, processing power and/or computing resources can be redistributed to one or more applications that have a lower throttling priority (i.e., high QoS level applications). For example, where the processing power allocated to low QoS application is throttled, that processing power can be redistributed to one or more high QoS applications. This maintains and, in some instances, increases the processing power available to high QoS applications, thereby maintaining and, in some instances, improving the user experience while still addressing platform mitigation thresholds proactively and/or dynamically. In other implementations, the processing power is not redistributed. For example, where a platform mitigation threshold is exceeded, the power budget manager throttles the processing power according to process 300 to reduce the overall use of computing resources for a time.

In some examples, the throttling module 124 may throttle the processing power allocated to one or more applications 130 by implementing one or more of an EPP control to reduce a number of cores 109 available to the one or more applications 130 and/or implement a frequency cap on the maximum CPU frequency allocated to the one or more applications 130. The EPP control 503, reducing the number of cores 109 available to an application 130, and the maximum cap on the frequency limit 507 on CPU frequency are described in greater detail with regards to the description of FIG. 5.

At operation 313, the threshold monitoring module 122 determines whether the one or more monitored platform mitigation thresholds is mitigated, that is whether the system data or signals received after throttling operations still reflect the same levels previously determined prior to throttling. For example, where the one or more monitored platform mitigation thresholds is still exceeded even after throttling the processing power of one or more applications 130, additional throttling may be required so the levels detected by the one or more sensors 114 are brought below the platform mitigation threshold, or sub-threshold where proactive mitigation measures are being taken. Where the one or more monitored platform mitigation thresholds, or sub-thresholds, is no longer exceeded after throttling, the process returns to operation 301.

In some implementations, determining whether the one or more monitored platform mitigation thresholds is still exceeded includes analyzing updated data 134 collected from the one or more sensors 114 and comparing the updated collected data 134 to the platform mitigation threshold. For example, where the platform mitigation threshold is a first temperature sub-threshold, temperature data is collected from one or more of the sensors 114 to determine the current temperature of the computing device 102. Where the updated collected temperature data is less than the first temperature sub-threshold (i.e., the device temperature has lowered based on throttling the processing power allocated to the one or more applications 130), the threshold monitoring module 122 determines the platform mitigation threshold is no longer exceeded and the method 300 returns to operation 301 and continues to monitor the one or more platform mitigation thresholds. Where the updated collected temperature data is still at or above the platform mitigation threshold (i.e., the device temperature has not lowered, or has not lowered sufficiency enough, based on throttling the processing power allocated to the one or more applications 130), the power budget manager 142 determines the platform mitigation threshold remains exceeded and then returns to operation 309 to determine the next application 130 for which the allocated processing power will be throttled in order for the platform mitigation threshold to be mitigated, or to no longer be exceeded.

Accordingly, various examples of the present disclosure provide a dynamic feedback loop that provides feedback regarding data 134 of the computing device 102 in real-time, enabling sufficient processing power to be properly allocated to the highest priority applications based on QoS level designations while throttling, when necessary, the processing power allocated to lower priority applications. As described above, in real-time can refer to frequent recalculations of an overall score for each application 130, such as recalculating an overall score every 30 ms, to enable sufficient processing power to be properly allocated to high QoS applications. The dynamic feedback loop therefore enables sufficient processing power to be allocated to the highest priority applications 130, while throttling the processing power allocated to lower priority applications 130, which enhances a user experience with the computing device 102. In some examples, processing power for low QoS applications executing in the background can be throttled while processing power for high QoS application executing in the foreground is maintained, improving the user experience while utilizing the computing device 102.

Figure 4:
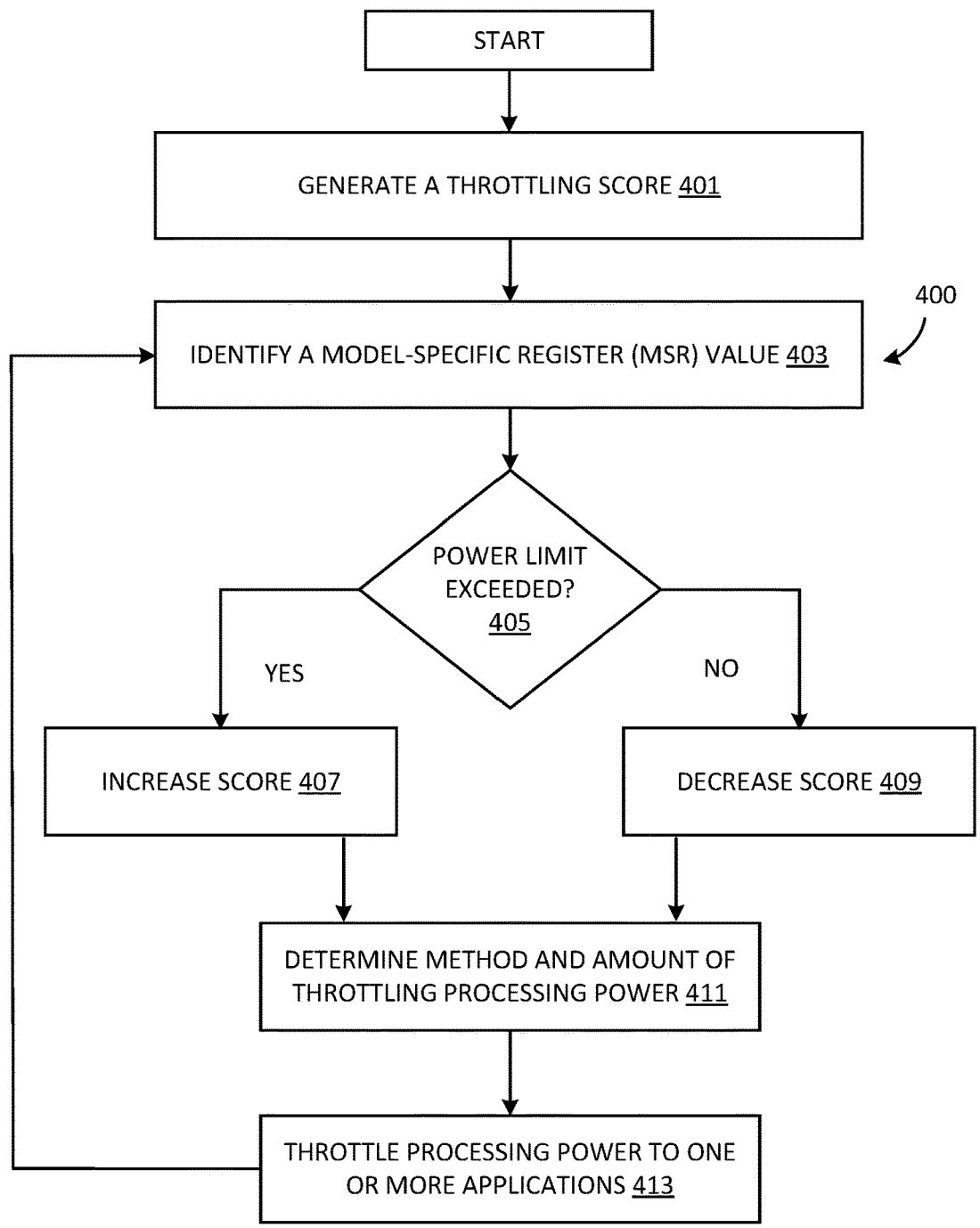
FIG. 4 is a computerized method of calculating a throttling score according to examples of the present disclosure.

As described herein, a throttling score may be calculated and used to determine whether throttling is required and, if so, to what degree. For example, FIG. 4 is a computerized method of calculating a throttling score according to examples of the present disclosure. The computerized method 400 of FIG. 4 is provided for illustration only and should not be construed as limiting. Other examples of the computerized method 400 can be used without departing from the scope of the present disclosure. In some examples, the computerized method 400 is implemented by the computing device 102 and/or the computing device 600. In some implementations, the computerized method 400 is iterated periodically at regular intervals, such as every 30 ms, or any other configurable interval.

The computerized method 400 begins by generating a throttling score in operation 401. The throttling score is iteratively generated as the processor 108 executes one or more processes of the computing device 102. For example, an initial throttle score may be generated upon the computing device 102 being turned on and iterative throttling scores may be generated at regular intervals following the generation of the initial throttling score. The throttling score quantifies the amount of processing power to be throttled for a particular application 130. For example, the power budget manager 142 may determine when and by how much to tune the EPP control by restricting the number of allowed cores and/or implementing the maximum cap of the CPU frequency based on the calculated throttling score, as described in greater detail below in the description of FIG. 5. In other words, the throttling score can be used to make determinations regarding when and by how much to reduce processing power for one or more of background applications 130, foreground applications 130 in focus on the user interface 110, and foreground applications 130 not in focus or partially in focus on the user interface 110.

In operation 403, at a next interval, the power budget manager 142 identifies a model-specific register (MSR) value by executing a processor power management (PPM) check. In some implementations, each interval for a next PPM check is 30 ms. However, the interval may be longer or shorter than 30 ms. An MSR value includes various values that trace program execution, monitor performance, or toggle various CPU features. In performing each PPM check, the length of time under which goals are not met, i.e., how long the power budget manager 142 has been exceeding temperature or power thresholds, is evaluated to determine the prevalence of an issue. In some implementations, the severity of the issue is also evaluated directly by measuring the impact to foreground, high QoS applications by evaluating performance metrics from the applications 130 or indirectly by evaluating the CPU frequency of the high QoS applications 130.

In operation 405, based on the identified MSR value, the power budget manager 142 determines whether a particular power limit has been reached and adjusts the generated throttling score based on the determination and the identified MSR value. Where the power limit has been reached, the method 400 proceeds to operation 407 and the power budget manager 142 increases the throttling score. Where the power limit has not been reached, the method 400 proceeds to operation 409 and the power budget manager 142 reduces the throttling score.

In some implementations, when determining to increase or decrease the throttling score, the power budget manager 142 determines by how much, or to what degree, to increase or the decrease the throttling score, respectively. The power budget manager 142 may determine to what degree to increase or decrease the throttling score based on a step size evaluation. A step size may be based on time. For example, the step size may be a measure of how long the processing power has failed to meet the threshold or target. In another example, the step size is a measure of how far away from the threshold or target the current amount of processing power is. Thus, if the computing device 102 fails to meet the target for an extended period of time or is a large margin away from the target, the step size is larger and the throttling score may be increased more rapidly, producing a more aggressive response as described in greater detail below in the description of FIG. 5. In yet another example, the step size may differ to increase or decrease the score. In other words, the throttling score may be increased quickly to react quickly but have a smaller step size when decreasing the throttling score to more gradually reduce the throttling response.

In operation 411, the budget manager 142 determines a method by which to throttle processing power to one or more applications 130 based on the updated throttling score in either operation 407 or 409. For example, the budget manager 142 can update one or more of the allowed QoS cores 505 and frequency 507, as described in greater detail below, in order to throttle processing power allocated to one or more applications 130.

In operation 413, the power budget manager 142 throttles the processing power allocated to one or more applications 130 as determined in operation 411 by one or more methods described below in the description of FIG. 4. In some implementations, the power budget manager 142 automatically adjusts the throttling of processing power for the aggressiveness of throttling that is required. In other words, the power budget manager 142 determines how quickly and aggressively to scale back or reduce the processing power. For example, the power budget manager 142 may include an auto-throttling mechanism as a failsafe to avoid compromising the structural integrity of the CPU. Following the throttling of processing power allocated to the one or more applications 130, the computerized method 400 returns to operation 403 at the next interval for the PPM check and identifies an updated MSR value. Accordingly, aspects of the present disclosure recognize that if the CPU has already automatically throttled, the throttling processes described herein will also be more aggressive to throttle additional issues identified in the background.

As described herein, varying amounts of throttling severity are implemented to more precisely throttle the processing power allocated to one or more applications 130. For example, maximum throttling of the processing power for one or more applications 130 may not be required in each instance of throttling or may not be desirable in order to maximize the user experience while interacting with the user interface 110. In these implementations, the power budget manager 142 can implement a step system that gradually increases or decreases the severity of throttling.

Figure 5:
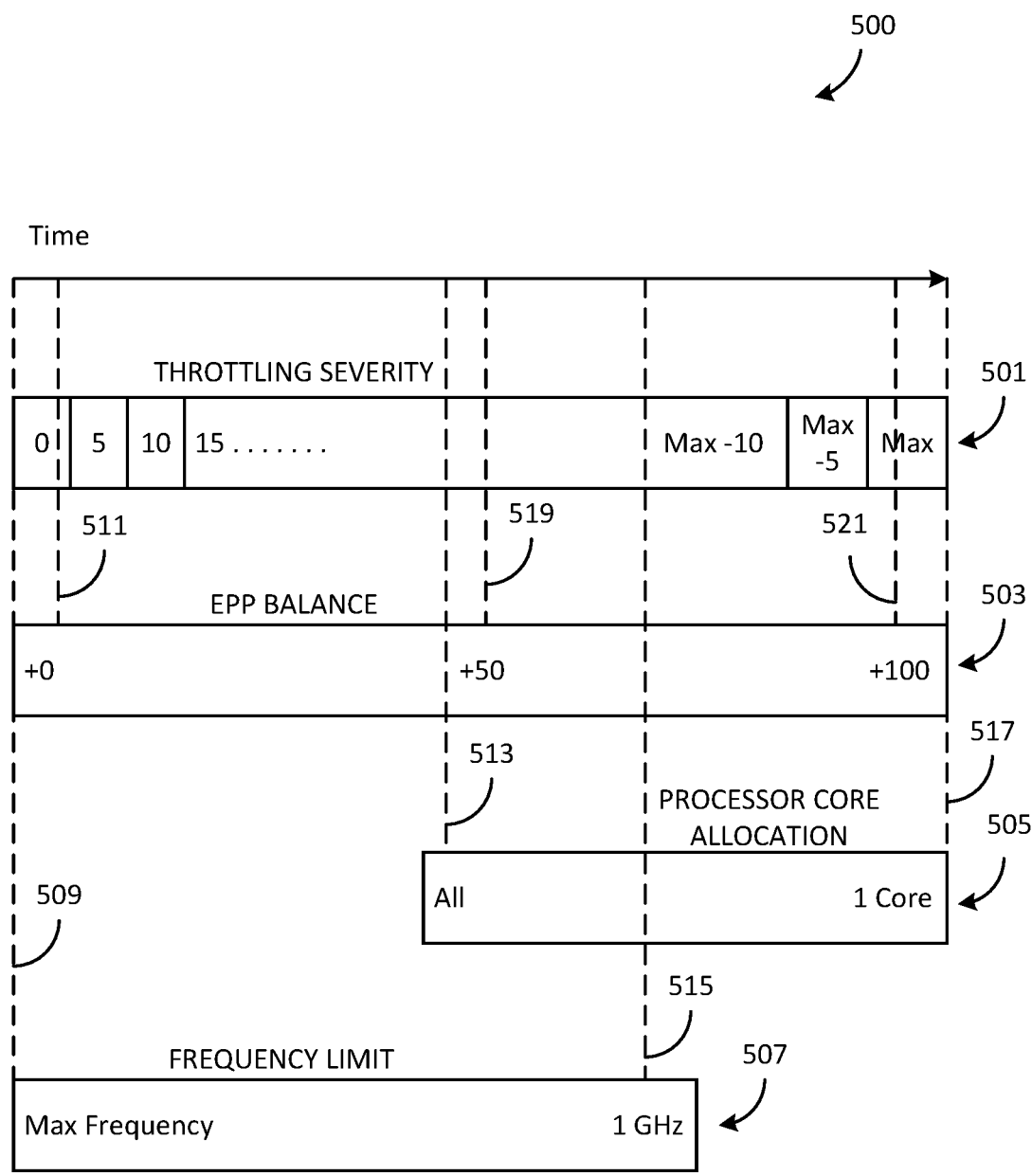
FIG. 5 is a system diagram illustrating examples of throttling severity according to examples of the present disclosure.

For example, FIG. 5 is a system diagram illustrating examples of throttling intensity, or severity, according to examples of the present disclosure. The system diagram 500 illustrated in FIG. 5 is provided for illustration only. Other examples of the system diagram 500 can be used without departing from the scope of the present disclosure. In some examples, the system diagram 500 illustrates how throttling is accomplished.

FIG. 5 illustrates the impact of several throttling techniques that may be used by the throttling module 124 of the power budget manager to throttle processing power allocated to one or more applications 130 over time. For example, FIG. 5 illustrates managing a throttling severity 501 by one or more of processor core allocation 505 and a frequency limit 507, which is the frequency at which the processor can generate pulses, which are used to synchronize the operations of processing components. The EPP balance 503 is a measure of the severity of the implementing the frequency limit 507 and/or reducing the number of available cores 505 to one or more applications 130. The EPP balance 503 is a throttling technique that is used to the balance between performance vs. energy savings. Processor core allocation 505 includes reducing the number of cores 109 available to an application or level of applications, which restricts the processing power available to the particular application or levels of applications. Reducing the maximum CPU frequency for a given application or level of applications reduces the maximum processor speed, which in turn reduces the power allocated to the given application(s) and impacts application performance.

In some implementations, these various techniques can be implemented separately. In other implementations, one or more of the techniques can be implemented in combination, in succession, and/or in parallel to address platform mitigation thresholds. In one embodiment, frequency limit 507 may be applied first, and then core allocation may be reduced next, with a configurable option in the amount of overlap for the frequency reduction and core limiting, based on the desired performance and experience parameters.

The system diagram 500 illustrates a throttling severity 501. The throttling severity 501 measures a severity of the throttling that is performed. The throttling severity 501 may measure the throttling score generated as illustrated in FIG. 4 and may be used to determine which throttling mechanism or mechanisms to implement and how strongly to implement the determined throttling mechanism or mechanisms. As shown in FIG. 5, the throttling severity 501 is defined by a step size of 5, 10, 15, the maximum step minus ten, the maximum step minus five, and the maximum step size. The step size may be a measure of how much the throttling score is increased or decreased, as described in the description of FIG. 4. For example, at throttling severity 0, identified as time 509, no throttling is performed and at throttling severity max, identified as time 517, the maximum strength of throttling is performed. The system diagram 500 illustrates that as the throttling severity 501 increases toward the maximum throttling severity, the EPP control is increased by decreasing the number of allocated cores 505 for an application 130 or applications 130 from all cores being available to one core being available and applying a frequency limit 507 to cap the available frequency at 1 GHz in order to slow the speeds at which an application 130 or applications 130 may run.

When the EPP control 503 technique is applied to control balance at 511, +0 at step 0 indicates that the EPP control favors performance at the cost of energy savings. Over time, the EPP control 503 may be tuned to balance the performance and energy savings, as illustrated at +50 at reference number 519, where the frequency limit 507 has been implemented for some time and the reduction of available cores 505 has just been initiated, or to favor energy savings over performance, as illustrated at +100 at reference number 521, where the processor cores have been reduced to just 1 core and the maximum frequency limit is down to 1 GHz. Employing the EPP control technique enables a more gradual method of adjusting power consumption and energy savings associated with a given application, rather than a binary option of throttling the processing power allocated to the given application or not throttling the processing power. Put another way, reference number 511 represents a time at +0 without additional EPP control, reference number 519 represents a time at +50 where the EPP control is tuned to equally balance performance and energy savings, and reference number 521 represents a time at +100 where the EPP control is tuned to favor energy savings over performance.

The system diagram 500 further illustrates the technique of reducing the allocated cores 505 allowed to an application. In this illustrative example, at reference number 513, where the EPP control reaches +50, the power budget manager 142 begins restricting or reducing the number of cores 109 on which applications 130 are allowed to execute. Restricting access for applications 130 to run on fewer cores 109 can reduce the power consumption of the application 130, while freeing up cores for other higher priority applications if needed. The low QoS applications 130 may normally have all or many cores available to run on but, as throttling is applied, the power budget manager 142 may progressively reduce the number of available cores, down to even a single core if needed at reference number 517, to minimize power consumption and thus reduce the impact on user experience and performance from background applications.

The system diagram 500 further illustrates a frequency limit technique 507. A maximum frequency cap of CPU frequency is a harder limit than the EPP control 503 bias technique. As the power budget manager 142 detects additional throttling is necessary or recommended, a proportional cap to the CPU frequency available to given applications, such as low QoS applications, may be employed. In some implementations, this technique may be used to a point, such as at 1 GHz illustrated at the reference number 515 shown in the exemplary system diagram 500, because frequency capping to a value that is too low becomes suboptimal for power efficiency. In other words, power consumption can be reduced, and background activity can be throttled while only pushing so far so as not to negatively impact power efficiency.

Accordingly, the power budget manager 142 utilizes several mechanisms to throttle processing power, particularly processing power of background applications 130. In some implementations, the power budget manager 142 throttles processing power via the EPP process. For example, in systems that include processors which have autonomous control of their CPU frequency, also referred to as autonomous frequency ramping, the EPP value can be programmed for a frequency selection. In other words, rather than the throttling being controlled directly by the operating system of the computing device 102, the throttling may be controlled by the processor itself. Accordingly, the throttling may be indirectly controlled by the OS, rather than direct control of precise frequency by the OS. The EPP value may be added to in order to cause the processor to use less processing power and execute more efficiently or removed from in order to allow the processor to use more processing power at the cost of efficiency. The EPP mechanism described herein may be an ACPI standard interface for OS influence of autonomous frequency selection.

In some examples, the power budget manager 142 reduces the maximum frequency of the CPU while configured to run low QoS threads, for example from the maximum frequency to 1 GHz as shown in FIG. 5. In some examples, the power budget manager 142 restricts the number of cores on which low QoS threads can run at once, for example from all the cores to one core. In some examples, threads are dynamically scheduled, and CPU frequency is adjusted to reduce frequency based on a current state of the power relative to a budget, such as a thermal budget, of the system. In some examples, the frequency limits 507 begins to be restricted prior to the reduction in the number of allocated cores 505, as evidenced by the beginning of the frequency limits 507 occurring at an earlier time than the reduction in the number of allocated cores 505.

In one particular example, low QoS applications are throttled to 1 GHz over 40 PPM check intervals and then reduced to one core over the next 40 PPM intervals. In this example, the background instance may be throttled less aggressively for the remainder of the run due to the aggressive throttling early in the run.

In some implementations, the power budget manager 142 automatically adjusts the throttling of processing power for the aggressiveness of throttling that is required. In other words, the power budget manager 142 determines how quickly and aggressively to scale back or reduce the processing power. For example, the CPU of the power budget manager 142 includes an auto-throttling mechanism as a failsafe to avoid compromising the structural integrity of the CPU. Accordingly, aspects of the present disclosure recognize that if the CPU has already automatically throttled, the throttling processes described herein will also be more aggressive to throttle additional issues identified in the background.

Various examples of the present disclosure further determine a bitmask of which cores 109 each QoS level is authorized to run on. For example, as shown in Table 1, illustrated below, after each PPM check in which throttling is detected, the count of available cores for each QoS level can be configured and the bitmask exemplifying the particular processors available can be controlled. Accordingly, the number of cores 109, and which particular cores that the low QoS and eco QoS applications 130 are allowed to run on, is constrained to reduce their impact. In some examples, the particular cores made available to the low QoS applications 130 may be selected to optimally reduce their impact on the higher QoS applications 130. For example, scheduling can be restricted to prevent an impact on shared caches.

TABLE 1

|  | High | Med | Low | Eco |
| --- | --- | --- | --- | --- |
| Check 1 | Core count: 8 Bitmask: 11111111 | Core count: 8 Bitmask: 11111111 | Core count: 4 Bitmask: 00001111 | Core count: 2 Bitmask: 00000011 |
| Check 2 | Core count: 8 Bitmask: 11111111 | Core count: 8 Bitmask: 11111111 | Core count: 2 Bitmask: 00000011 | Core count: 1 Bitmask: 00000001 |
| ... | ... | ... | ... | ... |
| Check N | ... | ... | ... | ... |

Accordingly, various examples of the present disclosure enable different levels of throttling to be applied based on how proactive or reactive the input signals are. In some examples, proactive throttling includes tracking real-time power usage applied by QoS levels 144. In some examples, reactive throttling includes responding to a problem, such as a thermal limit being reached, CPU frequency being reduced, or a fan noise level occurring.

Various examples of the present disclosure further enable reducing power by adjusting CPU frequency and dynamic scheduling of threads at runtime based on current state of power use relative to thermal budget of the system. Determining where to schedule foreground and background threads can include dividing the power budget across different work in the system based on efficiency classes of cores 109. Various examples of the present disclosure further enable QoS systems to be leveraged by understanding which work needs to be prioritized from a power budget perspective, based on knowing levels of importance of work to foreground experience (either programmed by app/service developer or inferred from heuristics).

Various examples of the present disclosure enable automatic adjusting of processing power per-workload and form factors. Mechanisms can be applied in a manner that that is silicon and hardware independent, on any type of input signal or thermal- or power delivery-related challenges. The aggressiveness of scaling back resource usage can be adjusted automatically based on how close the system is to thermal limits or how fast thermal limits are approaching. Temporal ordering of managing resource can be used according to a work class (e.g., low, medium, high) to achieve a graded system. Power budget management can be allowed for differing components (e.g., CPU, GPU, NPU, disk).

Exemplary Operating Environment

Figure 6:
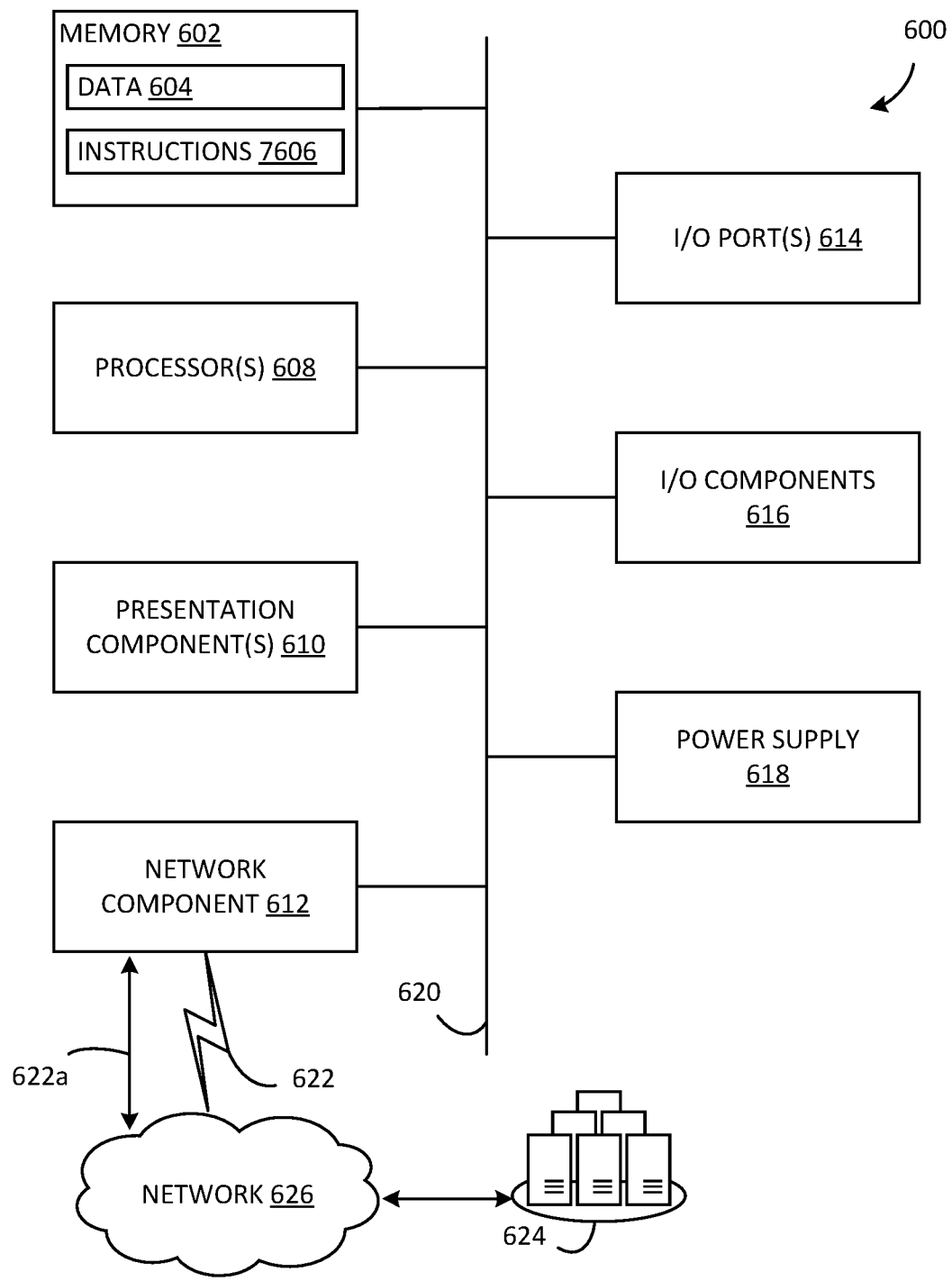
FIG. 6 is a block diagram of an example computing device for implementing examples of the present disclosure.

FIG. 6 is a block diagram of an example computing device 600 for implementing aspects disclosed herein and is designated generally as computing device 600. Computing device 600 is an example of a suitable computing environment and is not intended to suggest any limitation as to the scope of use or functionality of the examples disclosed herein. Neither should computing device 600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

In some examples, the computing device 600 is the computing device 102. Accordingly, the memory 602, the processor 608, the presentation component(s) 610, and the network 626 can be the memory 104, the processor 108, the user interface 110, and the network 140, respectively. However, these examples should not be construed as limiting. Various examples are possible.

Computing device 600 includes a bus 620 that directly or indirectly couples the following devices: computer-storage memory 602, one or more processors 608, one or more presentation components 610, I/O ports 614, I/O components 616, a power supply 618, and a network component 612. While computing device 600 is depicted as a seemingly single device, multiple computing devices 600 may work together and share the depicted device resources. For example, memory 602 may be distributed across multiple devices, and processor(s) 608 may be housed with different devices.

Bus 620 represents what may be one or more busses (such as an address bus, data bus, or a combination thereof). Although the various blocks of FIG. 6 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 602 may take the form of the computer-storage media references below and operatively provide storage of computer-readable instructions, data structures, program modules and other data for computing device 600. In some examples, memory 602 stores one or more of an operating system, a universal application platform, or other program modules and program data. Memory 602 is thus able to store and access data 604 and instructions 606 that are executable by processor 608 and configured to carry out the various operations disclosed herein. In some implementations, the memory is the memory 104 and/or the data storage device 132 and the data 604 is the data 134.

In some examples, memory 602 includes computer-storage media in the form of volatile and/or nonvolatile memory, removable or non-removable memory, data disks in virtual environments, or a combination thereof. Memory 602 may include any quantity of memory associated with or accessible by computing device 600. Memory 602 may be internal to computing device 600 (as shown in FIG. 6), external to computing device 600, or both. Examples of memory 602 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by computing device 600. Additionally, or alternatively, memory 602 may be distributed across multiple computing devices 600, for example, in a virtualized environment in which instruction processing is carried out on multiple computing devices 600. For the purposes of this disclosure, "computer storage media," "computer-storage memory," "memory," and "memory devices" are synonymous terms for computer-storage memory 602, and none of these terms include carrier waves or propagating signaling.

Processor(s) 608 may include any quantity of processing units that read data from various entities, such as memory 602 or I/O components 616 and may include CPUs and/or GPUs. Specifically, processor(s) 608 are programmed to execute computer-executable instructions for implementing aspects of the disclosure. The instructions may be performed by the processor, by multiple processors within computing device 600, or by a processor external to client computing device 600. In some examples, processor(s) 608 are programmed to execute instructions such as those illustrated in the in the accompanying drawings. Moreover, in some examples, processor(s) 608 represent an implementation of analog techniques to perform the operations described herein. For example, the operations may be performed by an analog client computing device 600 and/or a digital client computing device 600. In some implementations, the processor 608 is the processor 108 and executes various components, such as the power budget manager 142 including the application location determination module 118, power usage module 120, threshold monitoring module 122, throttling module 124, prioritizing module 126, and applications 130 described herein.

Presentation component(s) 610 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 600, across a wired connection, or in other ways. I/O ports 614 allow computing device 600 to be logically coupled to other devices including I/O components 616, some of which may be built in. Example I/O components 616 include, for example but without limitation, a microphone, joystick, game pad, satellite dish, scanner, printer, wireless device, etc.

Computing device 600 may operate in a networked environment via network component 612 using logical connections to one or more remote computers. In some examples, network component 612 includes a network interface card and/or computer-executable instructions (e.g., a driver) for operating the network interface card. Communication between computing device 600 and other devices may occur using any protocol or mechanism over any wired or wireless connection. In some examples, network component 612 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 612 communicates over wireless communication link 622 and/or a wired communication link 622a to a cloud resource 624 across network 626. Various different examples of communication links 622 and 622a include a wireless connection, a wired connection, and/or a dedicated link, and in some examples, at least a portion is routed through the internet.

Although described in connection with an example computing device, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

ADDITIONAL EXAMPLES

An example system for managing a power budget includes an operating system, at least one processor; a memory storing one or more applications that are executable by the at least one processor; and a power budget manager, implemented on the operating system, that designates each of the one or more applications with an individual quality of service (QoS) designation, assigns a throttling priority to each of the one or more applications based on the individual QoS designations, determines whether a platform mitigation threshold is exceeded, and responsive to determining that the platform mitigation threshold is exceeded, throttles processing power allocated to at least one application of the one or more applications based on the throttling prioritization.

An example computer-implemented method for managing a power budget includes designating, by a power budget manager implemented on at least one processor, each of one or more applications with an individual quality of service (QoS) designation, the one or more applications executable by the at least one processor, assigning, by the power budget manager, a throttling priority to each of the one or more applications based on the individual QoS designations, determining, by the power budget manager, whether a platform mitigation threshold is exceeded, and responsive to determining that the platform mitigation threshold is exceeded, throttling, by the power budget manager, processing power allocated to at least one application of the one or more applications based on the throttling prioritization.

An example one or more computer storage media storing a plurality of instructions for managing a power budget that, when executed by a processor, cause a power budget manager implemented on the processor to: designate each of one or more applications with an individual quality of service (QoS) designation, the one or more applications executable by the processor, assign a throttling priority to each of the designated one or more applications based on the individual QoS designations, determine whether a platform mitigation threshold is exceeded, and responsive to determining that the platform mitigation threshold is exceeded, throttle processing power allocated to at least one application of the one or more applications based on the throttling prioritization.

Alternatively, or in addition to the other examples described herein, examples include any combination of the following:
  wherein the platform mitigation threshold is at least one of a temperature threshold, a power consumption threshold, a noise level threshold, or an application performance threshold;
  wherein throttling the processing power allocated to the at least one application further comprises at least one of lowering a frequency cap of the at least one application or reducing a number of cores available to the at least one application;
the system further comprises a sensor configured to collect data in real-time or near real-time;
wherein the power budget manager monitors the collected data against the platform mitigation threshold;
wherein responsive to the throttling of the processing power to the at least one application, the power budget manager further analyzes updated collected data against the platform mitigation threshold;
wherein responsive to determining that the updated collected data meets or exceeds the platform mitigation threshold, the power budget manager throttles the processing power allocated to a next application of the one or more applications;
wherein the power budget manager further iteratively generates a throttling score, executes a processor power management check (PPM) at a predefined interval to identify a model-specific register (MSR) value, adjusts the generated throttling score based on the identified MSR value, and throttles the processing power allocated to the at least one application according to the adjusted throttling score;
wherein designating each of the one or more applications with the individual QoS designations further comprises identifying, by the power budget manager, one or more currently executing applications, and determining, by the power budget manager, a current status of the one or more currently executing applications;
wherein the current status is at least one of (i) executing in a foreground, visible and in focus on a user interface, (ii) executing in the foreground, visible or partially visible on the user interface, or (iii) executing in a background;
wherein the individual QoS designations include at least one of a high QoS level, a medium QoS level, a low QoS level, an eco QoS level, and a multimedia QoS level, lowering a frequency cap of the at least one application or reducing a number of cores available to the at least one application;
collecting, by a sensor, data in real-time or near real-time;
monitoring, by the power budget manager, the collected data against the platform mitigation threshold;
responsive to the throttling of the processing power to the at least one application, analyzing, by the power budget manager, updated collected data against the platform mitigation threshold, and responsive to determining that the updated collected data meets or exceeds the platform mitigation threshold, throttling, by the power budget manager, the processing power allocated to a next application of the one or more applications;
wherein designating each of the one or more applications with the individual QoS designations further comprises identifying, by the power budget manager, one or more currently executing applications, and determining, by the power budget manager, a current status of the one or more currently executing applications, wherein the current status is at least one of (i) executing in a foreground, visible and in focus on a user interface, (ii) executing in the foreground, visible or partially visible on the user interface, or (iii) executing in a background;
wherein the platform mitigation threshold is at least one of a temperature threshold, a power consumption threshold, a noise level threshold, or an application performance threshold;

lower a frequency cap of the at least one application or reduce a number of cores available to the at least one application;

receive data collected by a sensor, the data collected in real-time or near real-time;

monitor the collected data against the platform mitigation threshold;

responsive to the throttling of the processing power to the at least one application, analyze updated collected data against the platform mitigation threshold, and responsive to determining that the updated collected data meets or exceeds the platform mitigation threshold, throttle the processing power allocated to a next application of the one or more applications; and to designate each of the one or more applications with the individual QoS designations, identify one or more currently executing applications, and determine a current status of the one or more currently executing applications, wherein the current status is at least one of (i) executing in a foreground, visible and in focus on a user interface, (ii) executing in the foreground, visible or partially visible on the user interface, or (iii) executing in a background.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

What is claimed is:

1. A system for managing a power budget, the system comprising:
   an operating system;
   a processor;
   a memory storing one or more applications that are executable by the processor; and
   a power budget manager, implemented on the operating system, that:
   receives collected data in real-time or near real-time from a sensor;
   monitors the collected data against a platform mitigation threshold;
   designates each of the one or more applications with an individual quality of service (QoS) designation;
   assigns a throttling priority to each of the one or more applications based on the individual QoS designation;
   determines whether the platform mitigation threshold is exceeded based on the monitoring;
   responsive to determining that the platform mitigation threshold is exceeded, throttles processing power allocated to at least one application of the one or more applications based on the throttling prioritization;
   responsive to the throttling of the processing power allocated to the at least one application, analyzes updated collected data against the platform mitigation threshold;
   iteratively generates a throttling score for the at least one application;
   adjusts the generated throttling score based on the analysis of the updated collected data; and
   throttles the processing power allocated to the at least one application according to the adjusted throttling score.

2. The system of claim 1, wherein the platform mitigation threshold is at least one of a temperature threshold, a power consumption threshold, a noise level threshold, or an application performance threshold.

3. The system of claim 1, wherein throttling the processing power allocated to the at least one application further comprises at least one of:
   lowering a frequency cap of the at least one application or reducing a number of cores available to the at least one application.

4. The system of claim 1, wherein:
   responsive to determining that the updated collected data meets or exceeds the platform mitigation threshold, the power budget manager throttles the processing power allocated to a next application of the one or more applications.

5. The system of claim 4, wherein the power budget manager further:
   executes a processor power management check (PPM) at a predefined interval to identify a model-specific register (MSR) value;
   adjusts the generated throttling score based on the identified MSR value; and
   throttles the processing power allocated to the at least one application according to the adjusted throttling score.

6. The system of claim 1, wherein designating, by the power budget manager, each of the one or more applications with the individual QoS designations further comprises:
   identifying one or more currently executing applications, and determining a current status of the one or more currently executing applications.

7. The system of claim 6, wherein the current status is at least one of (i) executing in a foreground, visible and in focus on a user interface, (ii) executing in the foreground, visible or partially visible on the user interface, or (iii) executing in a background.

8. The system of claim 6, wherein the individual QoS designations include at least one of a high QoS level, a medium QoS level, a low QoS level, an eco QoS level, and a multimedia QoS level.

9. A computer-implemented method for managing a power budget, the computer-implemented method comprising:
receiving, by a power budget manager implemented on a processor, collected data in real-time or near real-time from a sensor;
monitoring, by the power budget manager, the collected data against a platform mitigation threshold;
designating, by the power budget manager, each of one or more applications with an individual quality of service (QoS) designation, the one or more applications executable by the processor;
assigning, by the power budget manager, a throttling priority to each of the one or more applications based on the individual QoS designation;
determining, by the power budget manager, whether the platform mitigation threshold is exceeded based on the monitoring;
responsive to determining that the platform mitigation threshold is exceeded, throttling, by the power budget manager, processing power allocated to at least one application of the one or more applications based on the throttling prioritization;
responsive to the throttling of the processing power allocated to the at least one application, analyzing updated collected data against the platform mitigation threshold;
iteratively generating a throttling score for the at least one application;
adjusting the generated throttling score based on the analysis of the updated collected data; and
throttling the processing power allocated to the at least one application according to the adjusted throttling score.

10. The computer-implemented method of claim 9, wherein throttling the processing power allocated to the at least one application further comprises at least one of:
lowering a frequency cap of the at least one application or reducing a number of cores available to the at least one application.

11. The computer-implemented method of claim 9, further comprising:
responsive to determining that the updated collected data meets or exceeds the platform mitigation threshold, throttling, by the power budget manager, the processing power allocated to a next application of the one or more applications.

12. The computer-implemented method of claim 9, wherein designating, by the power budget manager, each of the one or more applications with the individual QoS designations further comprises:
identifying one or more currently executing applications, and
determining a current status of the one or more currently executing applications, wherein the current status is at least one of (i) executing in a foreground, visible and in focus on a user interface, (ii) executing in the foreground, visible or partially visible on the user interface, or (iii) executing in a background.

13. The computer-implemented method of claim 9, wherein the platform mitigation threshold is at least one of a temperature threshold, a power consumption threshold, a noise level threshold, or an application performance threshold.

14. The computer-implemented method of claim 9, wherein the individual QoS designations include at least one of a high QoS level, a medium QoS level, a low QoS level, an eco QoS level, and a multimedia QoS level.

15. One or more computer storage media storing a plurality of instructions for managing a power budget that, when executed by a processor, cause a power budget manager implemented on the processor to:
receive collected data in real-time or near real-time from a sensor;
monitor the collected data against a platform mitigation threshold;
designate each of one or more applications with an individual quality of service (QoS) designation, the one or more applications executable by the processor,
assign a throttling priority to each of the designated one or more applications based on the individual QoS designation,
determine whether the platform mitigation threshold is exceeded based on the monitoring;
responsive to determining that the platform mitigation threshold is exceeded, throttle processing power allocated to at least one application of the one or more applications based on the throttling prioritization;
responsive to the throttling of the processing power allocated to the at least one application, analyze updated collected data against the platform mitigation threshold;
iteratively generate a throttling score for the at least one application;
adjust the generated throttling score based on the analysis of the updated collected data; and
throttle the processing power allocated to the at least one application according to the adjusted throttling score.

16. The one or more computer storage media of claim 15, further storing instructions to throttle the processing power allocated to at least one of the one or more applications that, when executed by the processor, cause the power budget manager to:
lower a frequency cap of the at least one application or reduce a number of cores available to the at least one application.

17. The one or more computer storage media of claim 15, further storing instructions that, when executed by the processor, cause the power budget manager to:
responsive to determining that the updated collected data meets or exceeds the platform mitigation threshold, throttle the processing power allocated to a next application of the one or more applications.

18. The one or more computer storage media of claim 15, further storing instructions to designate each of the one or more applications with the individual QoS designations that, when executed by the processor, cause the power budget manager to:
identify one or more currently executing applications, and
determine a current status of the one or more currently executing applications, wherein the current status is at least one of (i) executing in a foreground, visible and in focus on a user interface, (ii) executing in the foreground, visible or partially visible on the user interface, or (iii) executing in a background.

19. The one or more computer storage media of claim 15, wherein the individual QoS designations include at least one of a high QoS level, a medium QoS level, a low QoS level, an eco QoS level, and a multimedia QoS level.

20. The one or more computer storage media of claim 15, wherein the platform mitigation threshold is at least one of a temperature threshold, a power consumption threshold, a noise level threshold, or an application performance threshold.

* * * * *